Figure 1:
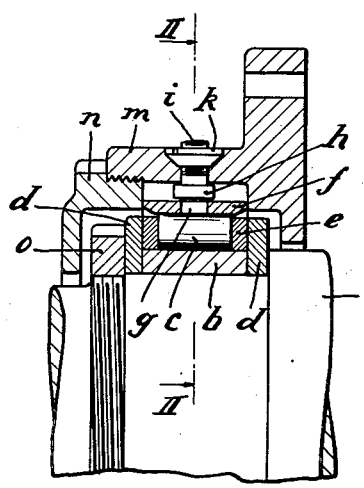

July 10, 1934.  K. TESSKY  1,965,729

ANTIFRICTION BEARING

Filed April 12, 1932

Inventor:
Karl Tessky

Patented July 10, 1934

1,965,729

UNITED STATES PATENT OFFICE 1,965,729

ANTIFRICTION BEARING

Karl Tessky, Esslingen, Germany

Application April 12, 1932, Serial No. 604,737
In Germany April 27, 1931

7 Claims. (Cl. 308—216)

My invention relates to anti-friction bearings. It is an object of my invention to so design an anti-friction bearing that its rotary members revolve on exactly circular curves about the axis of the bearing. To this end I split the outer race and provide means adapted to engage the race at opposite sides of its gap for widening the gap.

Anti-friction bearings, for instance, roller bearings, are larger than plain bearings of corresponding size so that it is necessary to make the races, and particularly the outer race, comparatively thin if the outside diameter of the bearing is limited. This, however, involves difficulties with respect to the condition that the bearing members should revolve on exactly circular curves. The races require hardening and therefore often assume an irregular shape after grinding because heat stresses are released, or other irregularities occur. This drawback cannot be eliminated by the very best workmanship, and, even if the bearing is perfectly true as finished, irregularities may occur later on and sometimes occur after the bearing has been built in.

In particular, a perfectly close fit of the outer race in the bore of the casing cannot be obtained in roller bearings of the usual type, because as a rule the outer races are mounted in the bores of their casings only at a comparatively loose fit. Therefore, the outer races are not perfectly cylindrical when fitted in their bores and obviously the shaft or journal of the bearing must not be expected to run in perfectly coaxial relation to the axis of the bearing.

This drawback is eliminated according to my invention if bearings must be absolutely true. In roller bearings the outer race is fitted closely into the bore of the casing by splitting it with a narrow gap forming grooves in the ends of the race at opposite sides of the gap and providing each groove with an extension having a wedge face. Rigid spreading means, such as a wedge are applied to the wedge faces and in turn apply the outer race closely to the exactly cylindrical bore in the casing throughout its perimeter. By applying the outer race to the bore in the manner described its inside diameter will be slightly varied and this may be made up for by means known in the art, for instance, by selecting rollers of suitable diameter, so that the coaxial relation of the inner and outer races is re-established.

By these means hitherto unequalled trueness of the bearings with regard to the perfectly cylindrical shape of the outer race and the exactly axial position of the shaft, is obtained.

In the drawing affixed to this specification and forming part thereof a portion of a roller bearing to which my invention is adapted, is illustrated diagrammatically by way of example, but it is understood that I am not limited to roller bearings.

In the drawing

Figure 2:
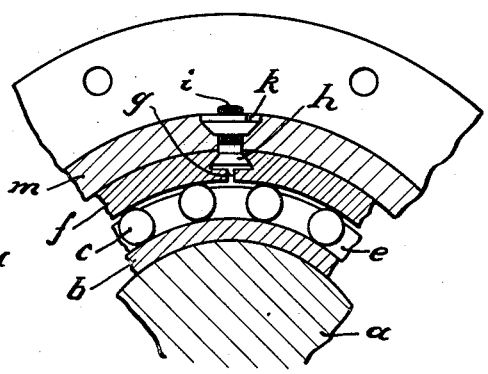
Figure 3:
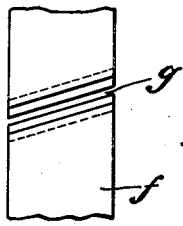

Fig. 1 is an axial section, showing about one half of the bearing and its shaft or journal, Fig. 2 is a section on the line II—II in Fig. 1, and Fig. 3 is a detail showing the ends of the split outer race.

Referring now to the drawing, $a$ is the journal or shaft of the bearing, $b$ is the inner race, $d$, $d$ are shrouds at opposite sides of the inner race, and $o$ is a threaded ring for holding the inner race and its shrouds in position with respect to a shoulder on the shaft or journal $a$. $c$ are the rollers, and $e$ are their cages. $f$ is the outer race, $m$ is the casing of the bearing which receives the outer race $f$ in bored flange, and $n$ is a threaded cap nut inserted at the outer end of the flange in the usual manner.

$g$, Fig. 3, is a gap in the outer race $f$ which is preferably arranged at an angle to its axis as shown in order to avoid jerking of the rollers when moving across the gap. The ends of the outer race are grooved at opposite sides of the gap and equipped with wedging faces so that the ends together make up a dove-tailed slot the bottom of which is spaced apart radially from the tread of the outer race $f$. $i$ is a bolt with a dove-tailed head $h$ which is mounted in a hole of the flange on the casing $m$, and $k$ is a nut which in the example illustrated is tapered and inserted in a countersunk seat of the flange so that it does not project from its outer wall. In this manner the overall size of the means for spreading the outer race is reduced, but obviously a normal nut might be placed on the outer perimeter of the flange, if desired.

If the nut $k$ is turned so as to move the bolt $i$ radially away from the axis of the bearing the wedge or dove-tailed faces on the grooves and on the head $h$ cooperate to spread the outer race $f$ until it closely fits the exactly cylindrical bore of the casing and thereby its tread also becomes exactly cylindrical.

It is understood that the anti-friction bearing may be of any suitable type. For instance, the rollers $c$ may be mounted directly on the journal or shaft $a$, i. e., without the inner race $b$. The spreading means may act in any desired direction, the only important condition being that the outer race should be closely applied to the bore of the casing so that its tread will become perfectly cylindrical.

In comparatively wide roller bearings, for instance, axle boxes and the like, any desired number of spreading means may be arranged side by side.

I wish it to be understood that I do not desire to be limited to the exact details of construction shown and described for obvious modifications will occur to a person skilled in the art.

In the claims affixed to this specification no selection of any particular modification of the invention is intended to the exclusion of other modifications thereof and the right to subsequently make claim to any modification not covered by these claims is expressly reserved.

I claim:—

1. An anti-friction bearing comprising a casing, a shaft, a split outer race ring adapted to be loosely received in a bore of said casing, anti-friction members inserted between said shaft and said race, and means adapted to engage in the gap of said race for spreading it so as to impart to it a true cylindrical shape by applying it closely to the inner wall of said bore.

2. An anti-friction bearing comprising a casing, a shaft, a split outer race ring adapted to be loosely received in a bore of said casing, anti-friction members inserted between said shaft and said race, wedge faces at opposite sides of the gap in said race, and adjustable wedging means adapted to engage said wedge faces whereby to apply the said outer race ring closely to the inner wall of the bore.

3. An anti-friction bearing comprising a casing, a shaft, a split outer race ring adapted to be loosely received in a bore of said casing, anti-friction members inserted between said shaft and said race, wedge faces at opposite sides of the gap in said race, wedging means adapted to engage said wedge faces, and means for displacing said wedging means radially with respect to said race whereby to apply the said outer race ring closely to the inner wall of the bore.

4. An anti-friction bearing comprising a casing, a shaft, a split outer race ring adapted to be loosely received in a bore of said casing, anti-friction members inserted between said shaft and said race, wedge faces at opposite sides of the gap in said race, spaced from the tread of the race, and adjustable wedging means adapted to engage said wedge faces whereby to apply the said outer race ring closely to the inner wall of the bore.

5. An anti-friction bearing comprising a casing, a shaft, a split outer race ring adapted to be loosely received in a bore of said casing, with undercut grooves at opposite sides of its gap and a wedge face in each groove, anti-friction members inserted between said shaft and said race, and adjustable wedging means adapted to engage the wedge faces in said grooves whereby to apply the said outer race ring closely to the inner wall of the bore.

6. An anti-friction bearing comprising a casing, a shaft, a split outer race ring adapted to be loosely received in a bore of said casing with dove-tailed grooves at opposite sides of its gap and a wedge face in each groove, anti-friction members inserted between said shaft and said race, and adjustable wedging means adapted to engage the wedge faces in said grooves whereby to apply the said outer race ring closely to the inner wall of the bore.

7. A roller bearing comprising a casing, a split outer race ring adapted to be loosely received in a bore of said casing, with grooves at opposite sides of its narrow gap and a wedge face in each groove which is spaced apart from the tread of the race, anti-friction members inserted between said shaft and said race, and rigid spreading means adapted to engage said wedge faces for spreading said race so as to apply it closely to the inner wall of said bore whereby to apply the said outer race ring closely to the inner wall of the bore.

KARL TESSKY.